(12) United States Patent
Ojanen

(10) Patent No.: US 6,536,790 B1
(45) Date of Patent: Mar. 25, 2003

(54) RUNNING BOARD MOUNTING BRACKET

(75) Inventor: Lassi M. Ojanen, Richmond Hill (CA)

(73) Assignee: Decoma International Inc., Concord (CA)

(*) Notice: Subject to any disclaimer, the term of this patent is extended or adjusted under 35 U.S.C. 154(b) by 0 days.

(21) Appl. No.: 09/787,828

(22) PCT Filed: Sep. 15, 1999

(86) PCT No.: PCT/CA99/00861

§ 371 (c)(1), (2), (4) Date: May 21, 2001

(87) PCT Pub. No.: WO00/17012

PCT Pub. Date: Mar. 30, 2000

Related U.S. Application Data

(60) Provisional application No. 60/101,297, filed on Sep. 22, 1998.

(51) Int. Cl.[7] .................................. B60R 3/00

(52) U.S. Cl. ...................... 280/163; 293/128

(58) Field of Search ................ 280/163, 762, 280/770, 164.1, 169; 293/128; 182/92, 112, 127; 403/292, 293, 300; 248/214, 66, 148, 188.8, 503

(56) References Cited

U.S. PATENT DOCUMENTS

| | | | | |
|---|---|---|---|---|
| 4,935,638 A | * | 6/1990 | Straka | 280/164.1 |
| 4,943,085 A | * | 7/1990 | Straka | 280/770 |
| 5,193,829 A | * | 3/1993 | Holloway et al. | 280/163 |
| 5,265,896 A | * | 11/1993 | Kravitz | 280/163 |
| 5,286,049 A | * | 2/1994 | Khan | 280/163 |
| 5,511,750 A | * | 4/1996 | Evenson | 248/200 |
| 5,895,064 A | * | 4/1999 | Laubach | 280/163 |
| 6,050,579 A | * | 4/2000 | Selland et al. | 280/163 |

* cited by examiner

Primary Examiner—Brian L. Johnson
Assistant Examiner—J. Allen Shriver
(74) Attorney, Agent, or Firm—Clark Hill PLC

(57) ABSTRACT

A running board mounting bracket has a structural body having a distal end and a support end. A mounting flange extends from the structural body at the support end and is canted relative to the longitudinal extent of the structural body. The mounting flange has bores for mounting the bracket to an inboard surface of a vehicle frame. A web extends between the mounting flange and the distal end redirecting bending forces from the interface between the mounting flange and the structural body and transferring the bending forces from the structural body to the mounting flange in a compressive manner. The web has a rib extending along the web forming an I-beam relation with the structural body.

13 Claims, 3 Drawing Sheets

RUNNING BOARD MOUNTING BRACKET

This application claims the benefit of Provisional application Ser. No. 60/101,297 filed Sep. 9, 1998.

FIELD OF INVENTION

This invention relates to a running board mounting bracket.

BACKGROUND OF INVENTION

Running boards are commonly mounted on pick-up trucks, van and sport utility vehicles. Typically, the running boards as illustrated in U.S. Pat. Nos. 5,286,049 and 5,193,829 are supported by corner or L-shaped brackets which are mounted to the frame of the vehicle. For factory installed running boards, the maximum permissible deflection of the outer extent of the running board is approximately 10 mm with a permanent set of 1.0 mm. As a result, the support brackets of the prior art must be manufactured from hardened steel.

In other examples of running board brackets as illustrated in U.S. Pat. Nos. 4,943,085 and 4,935,638, the bracket has a tubular body for receiving a tubular running board. The bracket has a tubular body with a flange plate. A gusset extends between the tubular body and the flange plate. However, the bracket mounts to an outboard face of a vehicle frame and will be positioned to transfer loads from the running board to the vehicle through the gusset primarily in tension. Again the support brackets of the prior art are required to be manufactured from hardened steel.

SUMMARY OF INVENTION

The disadvantages of the prior art may be overcome by providing a running board mounting bracket having a unique configuration for mounting a running board, which configuration may be manufactured from either steel or plastic and still be able to meet deflection criteria.

It is desirable to provide a running board mounting bracket having a triangular configuration which can be manufactured from either steel or plastic.

It is desirable to provide a running board bracket having an angled structural component which can be tubular, stamped, welded or injection molded.

It is desirable to provide a running board bracket which can be incorporated into stationary running boards and retractable running boards.

According to one aspect of the invention, there is provided a running board bracket having a hollow structural body having at least one open end. The structural body has a distal end and a support end. A mounting flange extends from the structural body at the support end. The mounting flange is canted relative to the longitudinal extent of the structural body. The mounting flange has bores for mounting the bracket to a vehicle frame. A web extends between the mounting flange and the distal end redirecting bending forces from the interface between the mounting flange and the structural body and transferring the bending forces from the structural body to the mounting flange in a compressive manner. The web has a rib extending along the web forming an I-beam relation with the structural body.

DESCRIPTION OF THE DRAWINGS

In Figures which illustrate embodiments of the invention.

DETAILED DESCRIPTION OF THE INVENTION

Figure 1:
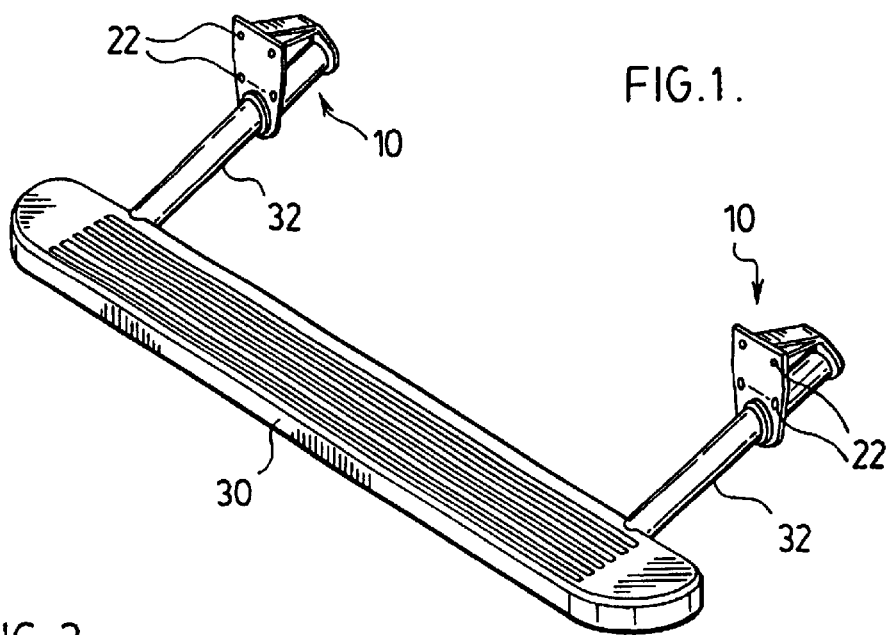
FIG. 1 is a perspective view of a running board incorporating a bracket of the present invention.
Figure 2:
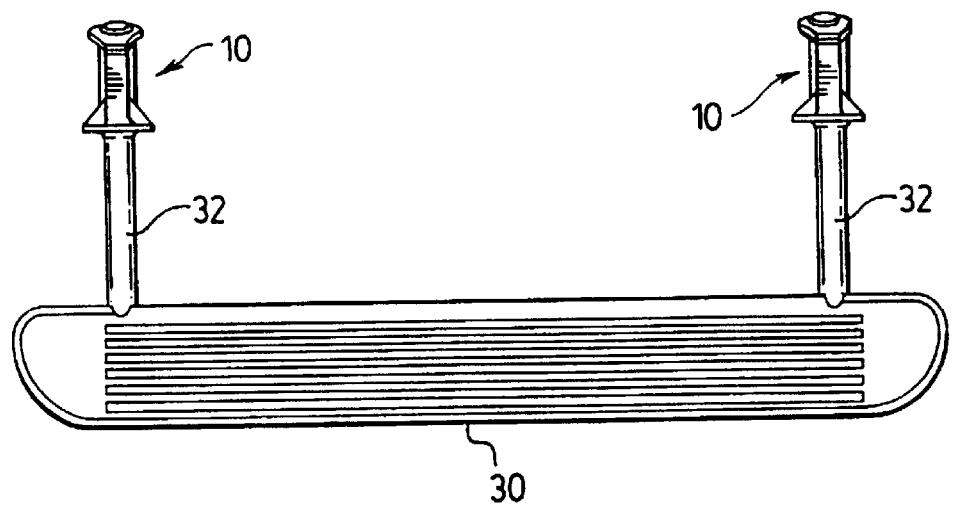
FIG. 2 is a top plan view of the running board of FIG. 1.
Figure 3:
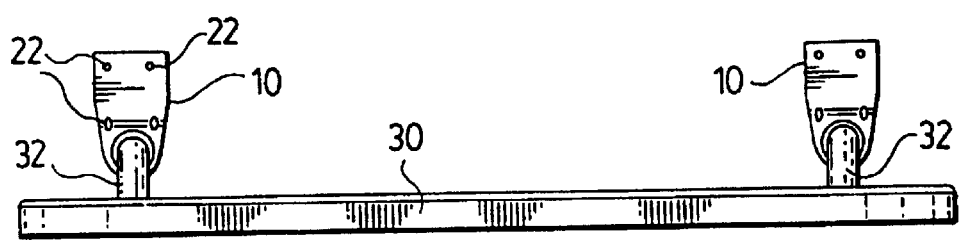
FIG. 3 is an end elevational view of the running board of FIG. 1.

Referring to FIGS. 1–3, there is illustrated a running board bracket 10 of the present invention. Two brackets 10 support a running board 30 of conventional design. Two support members 32 extend from the running board 30 and is received within brackets 10. The support members 32 are attached to running board 30 in a conventional manner.

Figure 4:
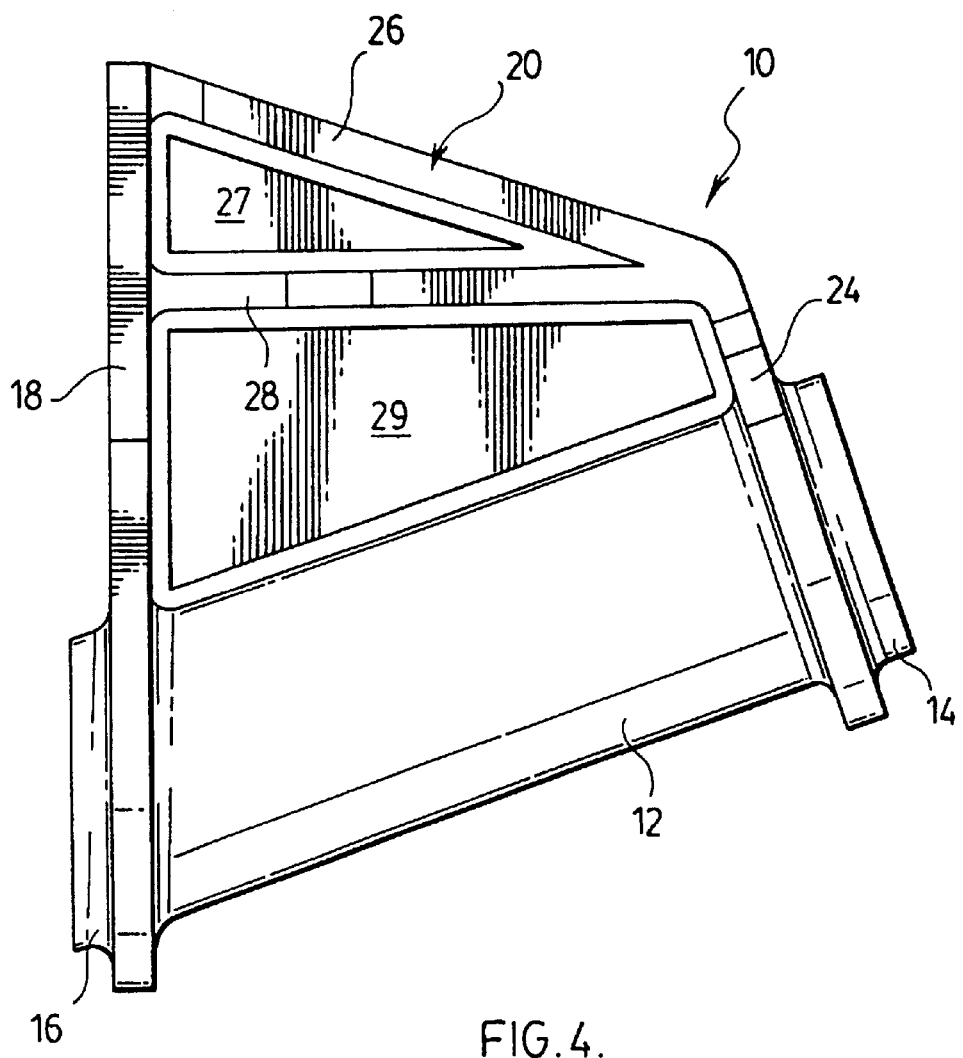
FIG. 4 is a side elevational view of the running board bracket of the running board of FIG. 1.

Referring to FIG. 4, bracket 10 generally comprises a hollow structural body 12 having an open distal end 14, an open support end 16, a mounting flange 18 and a web 20.

Support end 16 has a mounting flange 18 which surrounds the structural body 12 and is preferably integrated therewith. The mounting flange 18 is canted at an angle to the longitudinal extend of the structural body 12. Flange 18 has a series of mounting bores 22 for mounting the bracket 10 to an inboard side of frame 23 of vehicle.

Web 20 extends between the mounting flange 18 and the structural body 12 and terminates in an annular ring 24. Ribs 26 and 28 extend generally orthogonal and longitudinal of the web 20 and cooperate with panels 27 and 29 to provide the web 20 in an I-beam structure relation. The web 20 is preferably integrated with mounting flange 18, the structural body 12 and the annular ring 24.

Structural body 12 receives support member 32 in a complementary sliding or frictional fit, depending on the application. The drawings illustrated the structural body 12 and the support members 32 as being generally cylindrical and tubular. However, it is now apparent to those skilled in the art that any structural design which resists bending, such as an I-beam, will provide satisfactory results and are within the scope of the present invention.

The web 20 operates to resist bending of the structural body 12 about the mounting flange 18 and to resist buckling of the panels 27 and 29 during the application of downwardly applied forces from the weight of the user stepping on the running board 30. The downward forces will tend to cause the flange 18 to flex away from the vehicle frame. More importantly, the web 20 will evenly distribute the downward forces away from the interface between the flange 18 and the structural body 12.

In the prior art brackets, the downward applied forces become concentrated at the corner between the vertical portion which is mounted on the vehicle and the horizontal portion on which the running board is mounted. In order to resist these forces, the bracket must be sufficiently strong, which dictated the use of steel.

The bracket 10 of the present invention evenly distributes the forces in compression from the running board 30, through the support member 32, to the structural body 12, through the web 20 to the mounting flange 18 and ultimately to the vehicle frame 23. The configuration of the bracket 10 avoids point loads.

The bracket 10 of the present invention can be made from separate steel components and then welded together. However more preferably, the bracket 10 can be molded from a plastic material, such as reinforced NYLON™ or reinforced polypropylene. Plastic is preferred since it is less expensive to manufacture, resists corrosion and is lighter in weight.

Figure 5:
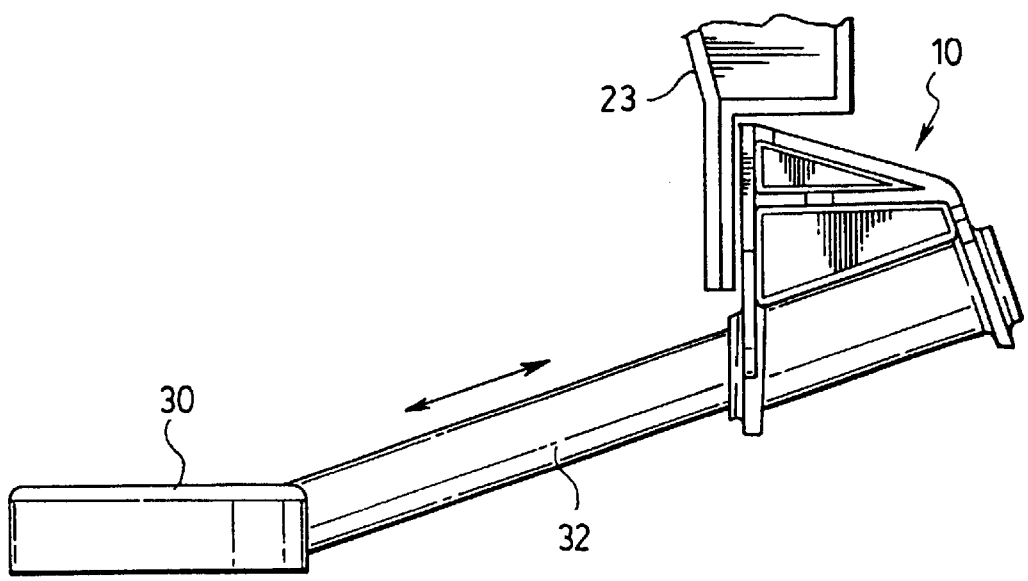
FIG. 5 is an end elevational view of the running board of FIG. 1, mounted on a vehicle frame.
Figure 6:
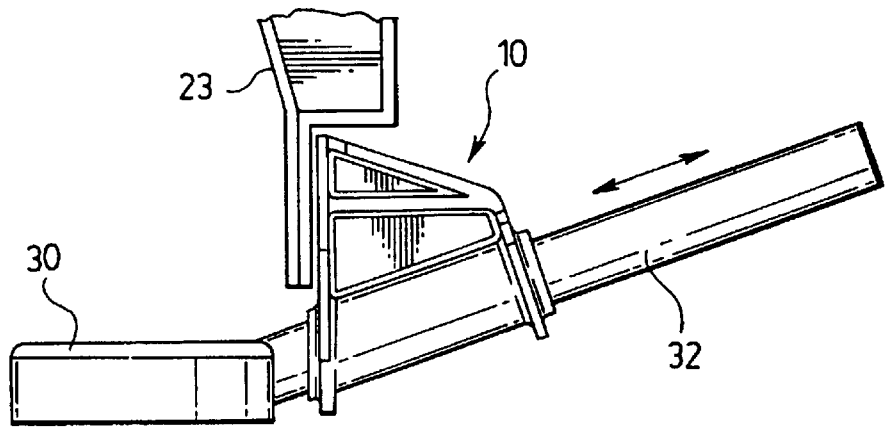
FIG. 6 is an end elevational view of the running board of FIG. 1, mounted on a vehicle frame and illustrated in a retracted position.

As illustrated in FIGS. 5 and 6, structural body 12 can be sized to slidingly receive support members 32. The running board 30 can be made retractable by incorporating a suitable drive to effect reciprocal movement of the support member 32 relative to the bracket 10.

Alternatively, support member 32 can be permanently affixed to the bracket 10 to present a fixed running board 30.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

I claim:

1. A running board mounting bracket comprising:
   a structural body extending longitudinally between a distal end and a support end,
   a mounting flange extending from said structural body at said support end, said mounting flange canted relative to the longitudinal extent of said structural body, said mounting flange having bores for mounting said bracket to a vehicle frame,
   a web extending between said mounting flange and said distal end redirecting bending forces from the interface between said mounting flange and said structural body and transferring said bending forces from said structural body to said mounting flange in a compressive mariner, said web including a rib extending generally orthogonal and longitudinal to said structural body between said mounting flange and said distal end and a panel extending generally perpendicular to said rib and longitudinal to said structural body between said mounting flange and said distal end forming an I-beam structural relation therebetween.

2. A running board mounting bracket as claimed in claim 1, further including an annular ring extending from said structural body at said distal end and said web engages and extends between said annular ring and said mounting flange.

3. A running board mounting bracket as claimed in claim 2, wherein said rib extends from said flange to said annular ring, said rib, web and structural body forming an I-beam relation therebetween.

4. A running board mounting bracket as claimed in claim 3, wherein said bracket is made of a plastic.

5. A running board mounting bracket as claimed in claim 2, wherein said web has a plurality of ribs extending orthogonal and longitudinal to said structural body from said flange to said annular ring, said ribs, web and structural body forming an I-beam relation therebetween.

6. A running board mounting bracket as claimed in claim 5, wherein said bracket is made of a plastic.

7. A running board mounting bracket as claimed in claim 1 wherein said structural body is hollow having at least one open end.

8. A running board bracket as claimed in claim 7 wherein said structural body is configured to receive an arm of a running board in a complementary fit.

9. A running board mounting bracket as claimed in claim 2 wherein said web has a first rib extending orthogonal and longitudinal to said structural body from said flange to said annular ring, a second rib spaced from said first rib and extending orthogonal and longitudinal to said structural body from said flange to said annular ring, a first panel extending generally perpendicular to and between said first and second ribs, and a second panel extending generally perpendicular to and between said structural body and said second rib.

10. A running board mounting bracket comprising:
    an annular ring having an opening therethrough configured to receive an arm of a running board in a complementary fit;
    a mounting flange spaced from said annular ring and canted relative to the longitudinal extent thereof, said mounting flange having an opening therethrough configured to receive the arm of the running board in a complementary fit and bores for mounting said bracket to a vehicle frame; and
    a web extending between said mounting flange and said annular ring, said web including a rib extending generally orthogonal and longitudinal between said mounting flange and said annular ring and a panel extending generally perpendicular to said rib and longitudinal between said mounting flange and said annular ring forming an I-beam structural relation therebetween for transferring bending forces from the arm to said mounting flange in a compressive manner.

11. A running board mounting bracket as claimed in claim 10, further including a hollow structural body extending longitudinally between a distal end attached to said annular ring and a support end attached to said mounting flange and configured to receive the arm of the running board therethrough.

12. A running board mounting bracket as claimed in claim 11, wherein said panel extending longitudinally between said support end and said distal end and between said structural body to said rib whereby said web redirects bending forces from the interface between said mounting flange and said structural body and transfers said bending forces from said structural body to said mounting flange in a compressive manner.

13. A running board mounting bracket as claimed in claim 12 wherein said web has a first rib extending orthogonal and longitudinal to said structural body from said flange to said annular ring, a second rib spaced from said first rib and extending orthogonal and longitudinal to said structural body from said flange to said annular ring, a first panel extending generally perpendicular to and between said first and second ribs, and a second panel extending generally perpendicular to and between said structural body and said second rib.

* * * * *